(12) United States Patent
Cao et al.

(10) Patent No.: US 12,536,638 B2
(45) Date of Patent: Jan. 27, 2026

(54) PAVEMENT TECHNICAL CONDITION DETECTION METHOD AND DEVICE BASED ON THREE-DIMENSIONAL CONTOUR (71) Applicant: Wuhan Optics Valley Zoyon Science and Technology Co., Ltd., Wuhan (CN)

(72) Inventors: Min Cao, Wuhan (CN); Hong Lin, Wuhan (CN); Xinlin Wang, Wuhan (CN); Xuan Qu, Wuhan (CN); Yuqiang Wang, Wuhan (CN); Chao Gao, Wuhan (CN); Qi Chen, Wuhan (CN); Xukai Xing, Wuhan (CN)

(73) Assignee: WUHAN OPTICS VALLEY ZOYON SCIENCE AND TECHNOLOGY CO., LTD., Wuhan (CN)

( * ) Notice: Subject to any disclaimer, the term of this patent is extended or adjusted under 35 U.S.C. 154(b) by 188 days.

(21) Appl. No.: 18/692,299

(22) PCT Filed: Apr. 7, 2022

(86) PCT No.: PCT/CN2022/085612
§ 371 (c)(1),
(2) Date: Mar. 14, 2024

(87) PCT Pub. No.: WO2023/045299
PCT Pub. Date: Mar. 30, 2023

(65) Prior Publication Data
US 2024/0386539 A1  Nov. 21, 2024

(30) Foreign Application Priority Data
Sep. 26, 2021  (CN) .......................... 202111129138.8

(51) Int. Cl.
G06T 7/187  (2017.01)
G01C 7/04   (2006.01)
(Continued)

(52) U.S. Cl.
CPC .............. *G06T 7/0002* (2013.01); *G01C 7/04* (2013.01); *G06F 18/241* (2023.01); *G06T 5/70* (2024.01);
(Continued)

(58) Field of Classification Search
None
See application file for complete search history.

(56) References Cited

U.S. PATENT DOCUMENTS

2013/0155061 A1* 6/2013 Jahanshahi ............... G06T 7/11
                                                   345/419
2018/0276832 A1    9/2018 Aikin
(Continued)

FOREIGN PATENT DOCUMENTS

CN    105809668 A    7/2016
CN    106373134 A    2/2017
(Continued)

OTHER PUBLICATIONS

Chinese Search Report re Application No. 2021111291388; 13 pages.
(Continued)

*Primary Examiner* — James A Thompson
(74) *Attorney, Agent, or Firm* — Lempia Summerfield Katz LLC (57) ABSTRACT

The present application provides a pavement technical condition detection method and device based on a three-dimensional contour. The method includes: acquiring three-dimensional contour data and grayscale data of a pavement on the basis of a line scanning three-dimensional measurement sensor; preprocessing the three-dimensional contour data and the grayscale data, where the preprocessing includes performing three-dimensional modeling according to the three-dimensional contour data to acquire three-dimensional (Continued)

(a)  (b)  (c)

modeling data and correcting the grayscale data; and extracting a key contour of each cross section in the three-dimensional modeling data, and performing pavement technical condition index detection on the pavement according to the three-dimensional modeling data, the key contour, and the corrected grayscale data to acquire a technical condition index of the pavement.

10 Claims, 2 Drawing Sheets

(51) Int. Cl.
| | |
|---|---|
| *G06F 18/241* | (2023.01) |
| *G06T 5/70* | (2024.01) |
| *G06T 7/00* | (2017.01) |
| *G06T 7/13* | (2017.01) |
| *G06T 7/155* | (2017.01) |
| *G06T 7/40* | (2017.01) |
| *G06T 7/50* | (2017.01) |
| *G06T 7/60* | (2017.01) |
| *G06T 7/73* | (2017.01) |
| *G06T 17/00* | (2006.01) |

(52) U.S. Cl.
CPC ............... *G06T 7/13* (2017.01); *G06T 7/187* (2017.01); *G06T 7/40* (2013.01); *G06T 7/50* (2017.01); *G06T 7/60* (2013.01); *G06T 7/75* (2017.01); *G06T 17/00* (2013.01); *G06T 7/155* (2017.01); *G06T 2207/20021* (2013.01); *G06T 2207/20036* (2013.01); *G06T 2207/20081* (2013.01); *G06T 2207/20164* (2013.01); *G06T 2207/30256* (2013.01)

(56) References Cited

U.S. PATENT DOCUMENTS

| | | | | |
|---|---|---|---|---|
| 2019/0339209 A1* | 11/2019 | Du | ........................ | G01N 33/42 |
| 2020/0118263 A1* | 4/2020 | Nogami | ................ | G06T 7/0004 |
| 2024/0281773 A1* | 8/2024 | Toribio | ............... | G06F 18/2431 |
| 2025/0191380 A1* | 6/2025 | Nepveaux | .............. | G06V 10/82 |

FOREIGN PATENT DOCUMENTS

| | | |
|---|---|---|
| CN | 107462204 A | 12/2017 |
| CN | 107633516 A | 1/2018 |
| CN | 110473187 A | 11/2019 |
| CN | 114049294 A | 2/2022 |
| WO | 2017120897 A1 | 7/2017 |

OTHER PUBLICATIONS

Road inspection Vehicle Based on 3D Technology, Highway Engineering, 5 pages, Jun. 2019, China Academic Journal Electronic Publishing House.

International Search Report re Application No. PCT/CN2022/085612; 2 pages.

Detection and Evaluation Methods of Pavement Wearing Based on Multi-line Texture, China Journal of Highway and Transportation, 6 pages, Mar. 29, 2016.

Li, Qingquan, Qin Zou, and Dejin Zhang. "Road pavement defect detection using high precision 3D surveying technology." Geomatics and Information Science of Wuhan University 42.11 (2017): 1549-1564.

* cited by examiner

"Original" Translation

"Original" Translation

PAVEMENT TECHNICAL CONDITION DETECTION METHOD AND DEVICE BASED ON THREE-DIMENSIONAL CONTOUR

CROSS-REFERENCE TO RELATED APPLICATION

The present application is a § 371 nationalization of PCT Application Serial Number PCT/CN2022/085612, filed Apr. 7, 2022, designating the United States which is hereby incorporated in its entirety by reference. The present application also claims priority to Chinese application No. 202111129138.8 filed on Sep. 26, 2021, entitled "Pavement Technical Condition Detection Method and Device Based on Three-Dimensional Contour", which is hereby incorporated by reference in its entirety.

FIELD

The present application relates to the field of line scanning three-dimensional data processing, in particular to a pavement technical condition detection method and device based on a three-dimensional contour.

BACKGROUND

Currently, main methods for detecting cracking and deformation distresses in transportation infrastructure include two-dimensional image recognition technology. The detection results of the traditional distress detection technology based on two-dimensional image depend on human subjectivity. In addition, when people work for a long time, their eyes are prone to fatigue, which results in extremely high rates of false detection and missed detection. Furthermore, the method relying on human eye detection cannot effectively detect a surface deformation of an object, which wastes a lot of labor resources.

In addition, an automatic surface defect detection technology based on two-dimensional machine vision has been developed currently. The technology acquires two-dimensional contour information of the surface defect of an object through the brightness information reflected back by the object, thereby achieving defect detection on the object surface. However, the depth information of the defect of the object cannot be acquired using such detection method. Further, in many cases, a defect recognition would become very difficult when significant two-dimensional defect features cannot be acquired through a special light source, and a recognition result is significantly different from a human eye recognition effect. Therefore, further research is required to meet the requirements of production inspection. In addition, the traditional method for detecting pavement technical condition uses different sensors for data acquisition for different detection indexes, resulting in high cost of pavement technical condition detecting equipment and difficulty in system maintenance.

SUMMARY

The present application provides a method and device for detecting pavement technical condition based on a three-dimensional contour, which solves defects of inaccurate and incomplete detection results of the pavement technical condition, high detection cost and difficulty in maintenance, and accurately detect various indexes of the pavement technical condition by using the precise three-dimensional contour, reducing the detection cost and facilitating maintenance.

The present application provides a method for detecting pavement technical condition based on a three-dimensional contour, including:
acquiring three-dimensional contour data and grayscale data of a pavement based on a line scanning three-dimensional measurement sensor;
preprocessing the three-dimensional contour data and the grayscale data, where the preprocessing the three-dimensional contour data and the grayscale data includes performing three-dimensional modeling on the three-dimensional contour data to acquire three-dimensional modeling data and correcting the grayscale data; and
extracting a key contour of each cross section of the three-dimensional modeling data, and performing pavement technical condition index detection on the pavement based on the three-dimensional modeling data, the key contour and corrected grayscale data to acquire a technical condition index of the pavement;
where the pavement technical condition index detection includes a microscopic deformation distress target detection, a macroscopic deformation distress target detection, a texture index detection, a target detection based on integrated depth and grayscale information, and a roughness detection of the pavement.

The present application provides a device for detecting pavement technical condition based on a three-dimensional contour, including a data acquisition platform, a power supply unit, a control unit, an index measurement unit, a data acquisition unit, a data processing unit and an abnormal warning unit;
where the data acquisition unit is an advanced reduced instruction set computer (RISC) machine (ARM) module, used for acquiring three-dimensional contour data and grayscale data of a pavement based on a line scanning three-dimensional measurement sensor;
the data processing unit is a field programmable gate array (FPGA) module, used for preprocessing the three-dimensional contour data and the grayscale data, where the preprocessing the three-dimensional contour data and the grayscale data includes performing three-dimensional modeling on the three-dimensional contour data to acquire three-dimensional modeling data and correcting the grayscale data; and extracting a key contour of each cross section of the three-dimensional modeling data;
the data acquisition platform includes a vehicle and a line scanning three-dimensional measurement sensor, and the line scanning three-dimensional measurement sensor is mounted outside a vehicle body of the vehicle;
the index measurement unit is used for performing pavement technical condition index detection on the pavement based on the three-dimensional modeling data, the key contour and corrected grayscale data to acquire a technical condition index of the pavement; where the pavement technical condition index detection includes a microscopic deformation distress target detection, a macroscopic deformation distress target detection, a texture index detection, a target detection based on integrated depth and grayscale information, and a roughness detection of the pavement:
the power supply unit is used for suppling power for the line scanning three-dimensional measurement sensor and the index measurement unit; and
the control unit is used for controlling the line scanning three-dimensional measurement sensor, the index measurement unit and the power supply unit.

In the method and device for detecting pavement technical conditions based on three-dimensional contour provided by the present application, the key contour, i.e., a main contour and a standard contour, of the pavement is acquired based on line scanning three-dimensional data of the pavement, and the pavement technical condition index detection is performed based on the key contour and three-dimensional modeling data through the method for pavement technical condition index detection. Therefore, the detected pavement technical condition index is more comprehensive and accurate. In addition, a plurality of indexes can be detected by acquiring only the line scanning three-dimensional data of the pavement, which can reduce the cost of pavement technical condition detection and facilitate maintenance.

BRIEF DESCRIPTION OF THE DRAWINGS

In order to illustrate the solutions disclosed in the embodiments of the present application more clearly, the drawings used in the descriptions of the embodiments or the related art are briefly described below. The drawings in the following description are only of certain embodiments of the present application, and other drawings may be acquired according to these drawings without any creative efforts for those skilled in the art.

DETAILED DESCRIPTION

In order to illustrate the solutions according to the present application more clearly, the accompanying drawings used in the description of the embodiments of the present application are briefly described below. It should be noted that the embodiments in the following description are only part embodiments of the present application. Any other embodiments acquired by those of ordinary skill in the art without creative efforts based on the embodiments of the present application fall in the scope of the present application.

Figure 1:
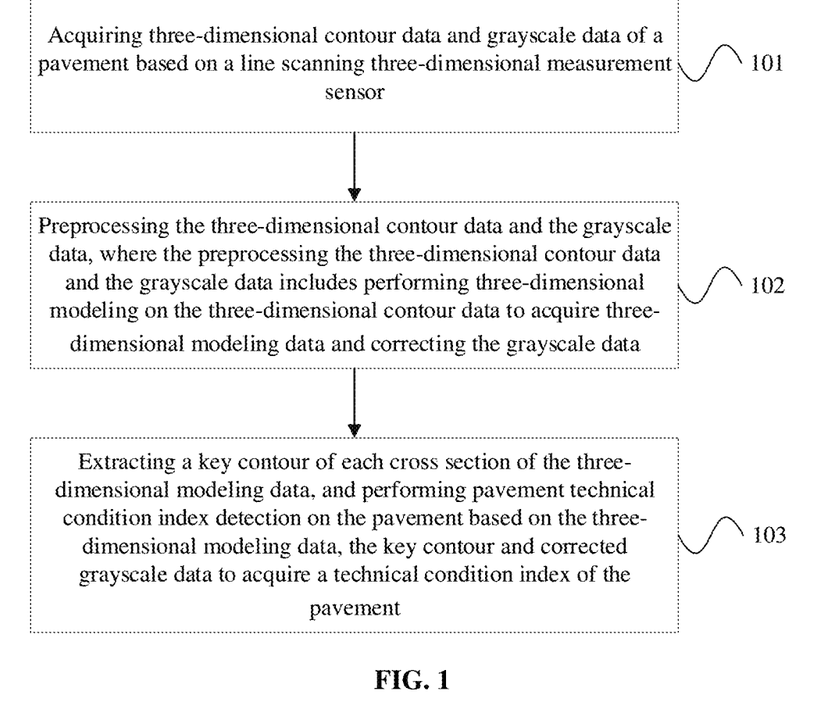
FIG. 1 is a flow diagram of a method for detecting pavement technical condition based on a three-dimensional contour according to the present application.

The following describes a method for detecting pavement technical condition based on a three-dimensional contour in combination with FIG. 1. The method includes a step 101, a step 102 and a step 103. The step 101: acquiring three-dimensional contour data and grayscale data of a pavement based on a line scanning three-dimensional measurement sensor.

In an embodiment, the line scanning three-dimensional measurement sensor is used for acquiring the three-dimensional contour data and the grayscale data of the pavement. The line three-dimensional measurement sensor includes a three-dimensional camera, a laser, a controller and an inertial measurement unit (IMU) attitude measurement sensor.

The three-dimensional camera uses the triangulation principle to acquire an elevation of the pavement relative to a laser line, and the laser projects the laser line along a breadth direction of the pavement. Cross section elevation data of the pavement can be acquired by a single measurement of the line scanning three-dimensional measurement sensor.

A sampling interval of the line scanning three-dimensional measurement sensor in a cross-section direction is 1 mm, the sampling interval of the line scanning three-dimensional measurement sensor in a driving direction is 3 mm, a measurement range in an elevation direction is greater than 300 mm, and the measurement breadth is 3800 mm.

A plurality of sets, such as two, of line scanning three-dimensional measurement sensors are used to acquire line scanning three-dimensional data of the pavement.

Step 102: preprocessing the three-dimensional contour data and the grayscale data, where the preprocessing the three-dimensional contour data and the grayscale data includes performing three-dimensional modeling on the three-dimensional contour data to acquire three-dimensional modeling data and correcting the grayscale data.

A method for pavement technical condition index detection in the present embodiment includes three parts: a fine three-dimensional modeling of a pavement, an acquiring of a key contour of a section and a detection of a pavement technical condition index. The present embodiment is not limited to the specific steps of a preprocessing.

Step 103: extracting the key contour of each cross section of the three-dimensional modeling data, and performing the pavement technical condition index detection on the pavement based on the three-dimensional modeling data, the key contour and corrected grayscale data to acquire a technical condition index of the pavement.

The pavement technical condition index detection includes a microscopic deformation distress target detection, a macroscopic deformation distress target detection, a texture index detection, a target detection based on integrated depth and grayscale information, and a roughness detection of the pavement.

The acquiring the key contour of the cross section includes acquiring a main contour and a standard contour of each cross section by signal separation technology. The main contour of each cross section includes the contour of the pavement with pavement texture removed, which reflects a main trend of the pavement contour, and contains large local deformation regions, such as a contour trend of pavement ruts, potholes, upheavals and subsidence.

The standard contour of each cross section includes the pavement contour with pavement texture and distress removed, which reflects the main trend of the pavement contour in case of no distresses.

The pavement technical condition indexes such as a pavement wear rate, a damage rate and an international roughness index are acquired based on the acquired three-dimensional modeling data, the key contour of the pavement cross section and the corrected grayscale data using the method for pavement technical condition index detection.

In the present application, the three-dimensional modeling data and the corrected grayscale data are acquired by preprocessing the three-dimensional contour data and the grayscale data. The key contour of the pavement is acquired based on line scanning three-dimensional data of the pavement, and the pavement technical condition index detection is performed based on the key contour and three-dimensional modeling data through the pavement technical condition index method. Therefore, the detected pavement technical condition index is more comprehensive and accurate. In addition, a plurality of indexes can be detected by acquiring only the line scanning three-dimensional data of the pavement, which can reduce the cost in the pavement technical condition detection and facilitate maintenance.

Based on the embodiments mentioned above, the key contour described in the present embodiment includes a main contour and a standard contour. The extracting key contours of each cross section in the three-dimensional modeling data includes: filtering the elevation data of each cross section to acquire a reference section contour of each cross section.

Steps for acquiring the main contour of the cross section include acquiring a reference section contour, processing abnormal points and acquiring a main contour.

The acquiring the reference section contour includes acquiring, initially, the reference section contour with local defects and large depth textures removed in the cross section using a median filtering, a low-pass filtering or a Fourier transform.

The abnormal points in each cross section are acquired based on an absolute distance between the elevation data of the corresponding measurement points between each cross section and the reference section contour of each cross section.

The processing the abnormal points includes calculating the absolute distance between elevation data of each point on the cross section and the elevation data of the measurement points on the reference section contour corresponding to each point on the cross section, and determining the abnormal points based on the absolute distance.

In an embodiment, the points on the cross section are sorted in an ascending order of the absolute distance, and a preset ratio of points on the cross section are selected as points on the main contour of the cross section, and the remaining points on the cross section are taken as abnormal points. The preset ratio is between 60% and 99%.

The elevation data of each abnormal point in each cross section are replaced with the elevation data of the measurement points in the reference section contour of each cross section, and the replaced elevation data of each cross section are filtered to acquire the main contour of each cross section.

The elevation data of the abnormal points are replaced with the elevation data of the points on the reference section contour corresponding to the abnormal points.

The acquiring the main contour includes performing mean filtering on the replaced elevation data of the abnormal points, and then acquiring the main contour of each cross section.

The elevation data of each cross section is rarefied based on a principal component analysis (PCA) algorithm, and the key points are extracted from each rarefied cross section based on a corner detection method.

The steps for acquiring the standard contour include abstract expression of section contour, adaptive segmentation of a section, section model matching and standard contour extraction.

The abstract expression of the cross-section contour includes first rarefying the elevation data of each cross section using the PCA algorithm, and then extracting the points whose curvature of the elevation data on the rarefied cross section is greater than the threshold value as the key points using the corner detection method.

Each cross section is divided into a plurality of sub-segments based on the key points in each cross section, and the similarity of features between each sub-segment of each cross section and other sub-segments in each cross section is calculated.

The adaptive segmentation of cross section includes performing adaptive segmentation on each cross section with key points in each cross section as segmentation points.

In an embodiment, the features of a sub-segment include one or more of the direction, elevation, texture, or position.

The sub-segments with the similarity greater than the preset threshold value are selected from the sub-segments of each cross section based on the similarity corresponding to each sub-segment of each cross section, and fitting is performed on the selected sub-segments to acquire the standard contour of each cross section.

The section model matching includes calculating the similarity between the feature of each sub-segment of each cross section and the feature of other sub-segments, multiplying the similarity of each sub-segment by a corresponding weight and adding products for each feature to acquire the final weight corresponding to each sub-segment. A higher weight is given for direction feature.

The standard contour extraction includes selecting sub-segments whose final similarity is greater than a preset threshold value from each cross section as reliable sub-segments; taking points in the selected reliable sub-segment as the points in the standard contour; fitting the reliable sub-segments to acquire unreliable sub-segment in the cross section; and using the points of the unreliable sub-segment acquired by fitting as the point in the standard contour.

Based on the embodiments mentioned above, the texture index detection in the present embodiment includes: calculating difference values between the elevation data of measurement points on each cross section and the elevation data of measurement points on the main contour of each cross section to acquire deviation values of the measurement points on each cross section.

The steps of pavement texture index detection include acquiring deviation values of the measurement points, dividing calculation units and calculating pavement texture indexes.

The acquiring the deviation values of the measurement points includes calculating difference values between the elevation data of each cross section and the elevation data of the main contour of each cross section to acquire a deviation value of each measurement point on the cross section.

The three-dimensional modeling data is divided, based on the preset length range, into a plurality of texture calculation units along the driving direction of the vehicle where the line scanning three-dimensional measurement sensor is mounted. Each texture calculation unit is divided into longitudinal profiles sets corresponding to a left wheel track band, a right wheel track band and a midline position of a lane of the vehicle based on the preset width range. A mean of sensor measured texture depth (SMTD) values or mean profile depth (MPD) values of each longitudinal profile set is calculated based on the SMTD values or the MPD values of each longitudinal section in each longitudinal section set.

The dividing the calculation units includes dividing the three-dimensional modeling data into a plurality of texture calculation units along the driving direction of the vehicle; dividing each texture calculation unit into a left wheel track, a right wheel track and a lane based on the preset width range; selecting the longitudinal section set corresponding to the left wheel track, the right wheel track and the center line of the lane; and calculating the mean of the SMTD or MPD average of each longitudinal section set based on SMTD values or MPD values.

A pavement wear rate of each longitudinal profile set is calculated based on the mean of the SMTD values or the mean of the MPD values of each longitudinal section set. The mean of the SMTD values or mean of the MPD values of each longitudinal section set and the pavement wear rate are used as the texture index of the pavement.

As for the calculation of the pavement texture indexes, the pavement texture indexes include one or more of SMTD, MPD and pavement wear. For each calculation unit, the $SMTD_L$ of the left wheel track band, the $SMTD_R$ of the right wheel track band and the $SMTD_C$ of the lane, or the $MPD_L$ of the left wheel track band, the $MPD_R$ of the right wheel track band and the $MPD_C$ of the lane are calculated according to the definition of SMTD or MPD. Then the pavement wear rate WR is calculated based on the $SMTD_L$ of the left wheel track band, the $SMTD_R$ of the right wheel track band and the $SMTD_C$ of the lane, or the $MPD_L$ of the left wheel track band, the $MPD_R$ of the right wheel track band and the $MPD_C$ of the lane.

Based on the embodiments mentioned above, in the present embodiment the pavement wear rate of each longitudinal section set is calculated by the following formula based on the SMTD average value or MPD average value of each longitudinal section set:

$$WR1 = 100 \times \frac{SMTD_C - \min\{SMTD_L, SMTD_R\}}{SMTD_C};$$

$$WR2 = 100 \times \frac{MPD_C - \min\{MPD_L, MPD_R\}}{MPD_C};$$

where WR1 and WR2 are the pavement wear rate of each longitudinal section set, $SMTD_C$ is a mean of the SMTD values of the longitudinal section set corresponding to the midline position of the lane, $SMTD_L$ is a mean of the SMTD values of the longitudinal section set corresponding to the central position of the left wheel track, $SMTD_R$ is a mean of the SMTD values of the longitudinal section set corresponding to the central position of the right wheel track, $MPD_C$ is a mean of the MPD values of the longitudinal section set corresponding to the midline position of the lane, $MPD_L$ is a mean of the MPD values of the longitudinal section set corresponding to the midline position of the left wheel track, and $MPD_R$ is a mean of the MPD values of the longitudinal section set corresponding to the midline position of the right wheel track band.

Based on the embodiments mentioned above, the target detection based on integrated depth and grayscale information in the present embodiment includes: determining a target initial positioning region in the pavement based on the corrected grayscale data: where the target initial positioning region includes the initial positioning region of pavement markings, pavement speed humps, pavement expansion joints and pavement repair.

In the target detection based on integrated depth and grayscale information, the pavement markings, pavement speed humps, pavement expansion joints and pavement repairs are typical representatives. The processes for the target detection based on the integrated depth and grayscale information includes target region initial positioning, target region determination, target geometric size measurement, target region classification, and target wear detection.

The target region initial positioning includes performing initial positioning on pavement markings, pavement speed humps, pavement expansion joints and pavement repairs based on the elevation and grayscale information of each point contained in the pavement line scanning three-dimensional data since the grayscale level of the targets is usually lower than or higher than that of the pavement background.

The target region in the target initial positioning region is determined based on a texture distribution and an edge feature of the elevation data of all points in the target initial positioning region.

The target region determination includes determining the target region using the elevation texture distribution and elevation edge features of the target initial positioning region.

The target region is processed based on morphology, and a geometric size of the processed target region is acquired.

The target geometric size measurement includes smoothing and filling the entire target region by morphological processing to acquire more complete target position information; and then, acquiring the length, width and elevation information of the target region in combination with the elevation distribution information in the target region.

A type of the target region is acquired by classifying the target region based on the grayscale data of the target region, the texture distribution of the elevation data and geometric size of the target region.

The target region classification includes classifying the target region using a grayscale distribution, a texture distribution, and geometric size information of the target region to acquire a target type.

The wear degree of the target region is calculated based on the elevation data of the target region and a calculation model corresponding to the type of the target region.

The target wear detection includes calculating the wear degree of the target region in combination with a standard model for the target type and the elevation distribution information in the target region.

Figure 2:
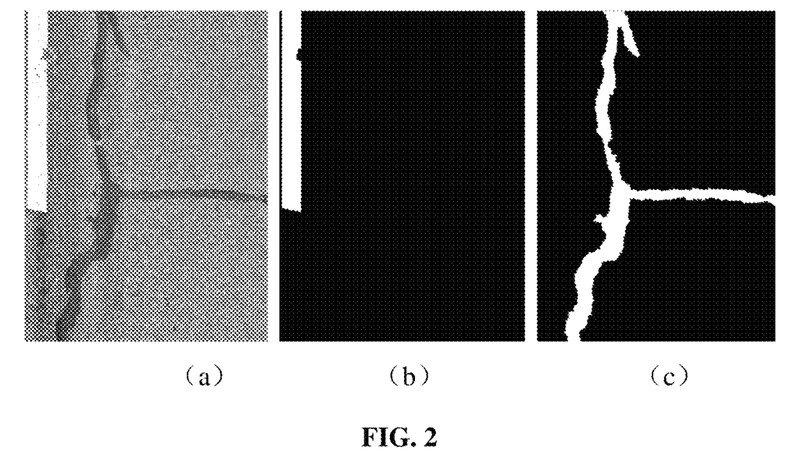
FIG. 2 is a schematic diagram of target detection results based on integrated depth and grayscale information in a method for detecting pavement technical condition based on a three-dimensional contour according to the present application.

As shown in FIG. 2, FIG. 2(a) is a grayscale image of a pavement, FIG. 2(b) is a marking detection result on a pavement, and FIG. 2(c) is a repair detection result on a pavement.

Based on the embodiments mentioned above, in the present embodiment, the performing the three-dimensional modeling on the three-dimensional contour data to acquire the three-dimensional modeling data includes: converting the three-dimensional contour data from image-side elevation data to object-side elevation data: performing measurement attitude correction on the object-side elevation data; processing the abnormal measurement points in the object-side elevation data on which the measurement attitude correction is performed; and splicing the cross section data of the object-side elevation data in which the abnormal measurement points are processed along the driving direction of the vehicle at which the line scanning three-dimensional measurement sensor is located to acquire the three-dimensional modeling data.

The fine three-dimensional modeling of pavement includes image-side-to-object-side conversion, measurement attitude compensation, abnormal data processing and section splicing.

The image-side-to-object-side conversion includes converting line scanning three-dimensional data from image-side elevation to object-side elevation using calibration files.

The measurement attitude compensation includes correcting the object-side elevation data based on mounting parameters and attitude information of the line scanning three-dimensional measurement sensor.

The abnormal data processing includes processing abnormal measurement points and local mutation points in the object elevation data subjected to attitude correction.

The section splicing includes splicing the cross-section data subjected to abnormal data processing into three-dimensional pavement modeling data along the driving direction. In addition, when data on the pavement are collected using a plurality of sets of line scanning three-dimensional measurement sensors, before splicing is performed along the driving direction, the section splicing further includes splicing transverse section data.

Based on the embodiments mentioned above, in the present embodiment, the microscopic deformation distress target detection includes: taking difference values between elevation data of the measurement points on each cross section and elevation data of the measurement points on the main contour of each cross section as local difference values.

The pavement cracking is a typical representative of the pavement microscopic deformation distress target. The pavement microscopic deformation distress target detection includes acquiring local difference value, acquiring section texture distribution, suspected target point segmentation, suspected target block dividing, suspected target classification based on sub-block, suspected target sub-block growth and target growth reduction.

The acquiring the local difference value includes subtracting the elevation data of the points on the cross section acquired by the fine three-dimensional modeling from the elevation data of the points on the corresponding main contour to acquire the local difference value; and calculating the mean local difference value in a preset range centered on each point in each cross section, and acquiring a threshold value corresponding to each point from the mean local difference value corresponding to each point.

The acquiring the section texture distribution includes calculating a mean local difference value $\overline{A}_i$ corresponding to each point in the preset range, i.e., the length L range, centered on each point on the cross section.

In an embodiment, the threshold $T_i$ corresponding to each point is $T_i = k * \overline{A}_i$.

When the local difference value corresponding to each point is greater than the threshold corresponding to each point, each point is regarded as a suspected target point.

The suspected target point segmentation includes marking the point whose local difference value is greater than the threshold $T_i$ as the suspected target point using a feature that the suspected target point is a local mutation anomaly point with respect to the main contour in combination with the section texture distribution to acquire a suspected target binary image.

The suspected target binary image is constructed based on the suspected target points in all cross section of the line scanning three-dimensional data, and the suspected target binary image is divided into blocks to acquire a plurality of suspected target sub-blocks.

The suspected target block dividing includes dividing the suspected target binary image into suspected target sub-blocks of m*n size.

Each suspected target sub-block is classified based on a deep learning model, the suspected target sub-blocks containing the target are acquired, and each suspected target sub-block containing the target is grown to acquire a crack morphological sub-block.

The suspected target classification based on sub-blocks includes dividing suspected target sub-blocks into sub-blocks with targets and sub-blocks without targets using the deep learning model.

The suspected target sub-block growth includes introducing a confidence criterion to evaluate the reliability of each sub-block containing the target, and growing each sub-block to acquire a set of crack morphological sub-blocks.

The microscopic deformation distress targets in the pavement are acquired based on all cracking morphological sub-blocks.

Figure 3:
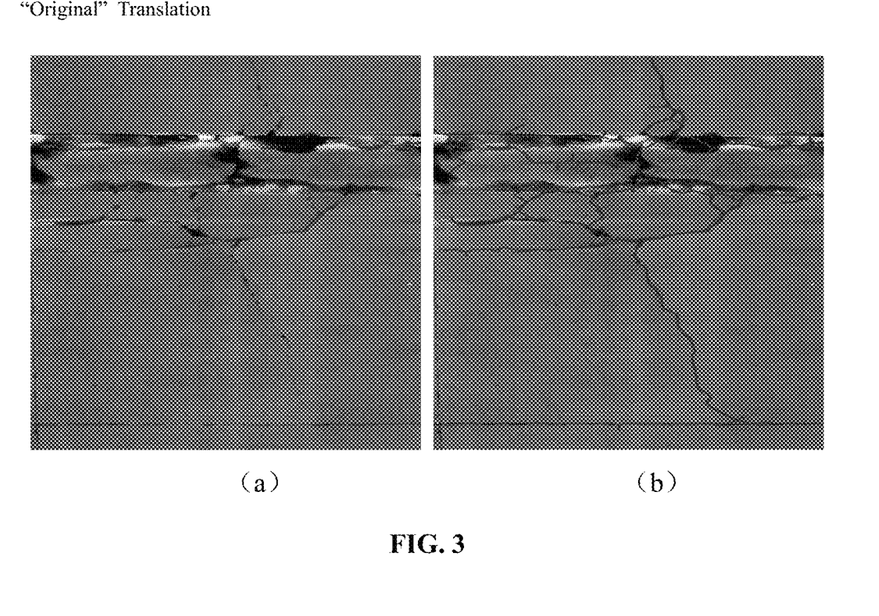
FIG. 3 is a schematic diagram of target detection results of microscopic deformation distresses of pavement in a method for detecting pavement technical condition based on a three-dimensional contour according to the present application.

In an embodiment, all the cracking morphology sub-blocks are integrated to acquire the microscope deformation target cracking in the pavement. The technical condition index of pavement is acquired based on the geometric features of cracks. FIG. 3(a) is a grayscale diagram converted from three-dimensional pavement modeling depth data, and FIG. 3(b) is a crack detection result.

Based on the embodiments mentioned above, the macroscopic deformation distress target detection in the present embodiment includes: calculating the difference value between the elevation data of the measurement points corresponding to the standard contour and the main contour of each cross section; and taking each point as a deformation feature point when the absolute value of the difference value between the elevation data corresponding to each point is greater than the threshold corresponding to each point.

Pavement potholes, upheavals, subsidence, and ruts are typical representatives of the macroscopic deformation distress targets. The detection steps include acquiring a macroscopic difference value, acquiring a deformation feature point, detecting a core deformation region, determining an edge of deformation region, acquiring geometry parameters of the deformation region, and classifying the deformation regions.

The acquiring the macroscopic difference value includes subtracting the standard contour from the main contour to acquire the macroscopic difference value. The acquiring the deformation feature point includes marking the points whose absolute value of macroscopic difference value on the cross section is greater than the threshold value as the deformation feature point.

Growing and denoising are performed by taking deformation feature points constituted a connected region as basic units on a deformation feature image constructed by the deformation feature points in all the cross sections of the line scanning three-dimensional data, and then the deformation region in the deformation feature image is acquired.

The detecting the core deformation region includes performing region growing and denoising by taking the deformation feature points of the connected region as the basic units and using the aggregation, continuity and geometric size features of the deformation region to acquire the core deformation region.

The edge of the deformation region is determined based on the difference values of the elevation data corresponding to each point in the deformation region or the edge features of the difference values of the elevation data, and the deformation region is determined based on the edge of the deformation region.

The determining the edge of deformation region includes determining the edge of the deformation region based on the edge features in the macroscopic difference value data for the deformation region with obvious edge features, and determining the edge of the deformation region based on the size of the macroscopic difference value for the slow deformation region without obvious edge features.

The acquiring the geometry parameters of the deformation region includes calculating a width, a length, an area, a mean degree of deviation and a geometrical morphology of the connected region by taking the connected region confirmed by the edge of the deformation region as a basic unit.

The mean degree of deviation includes a mean degree of deviation of the suspected distress points in the current connected region deviated from the standard contour. The geometrical morphology includes a direction and a shape.

Figure 4:
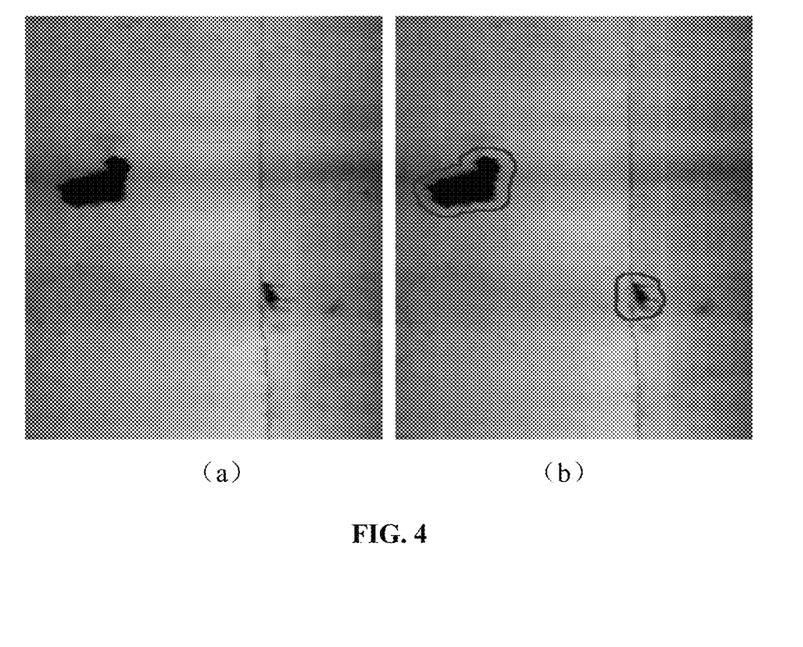
FIG. 4 is a schematic diagram of the target detection results of macroscopic deformation distresses of pavement in a method for detecting pavement technical condition based on a three-dimensional contour according to the present application.

The classifying the deformation regions includes classifying deformation regions by using a target model matching method or a deep learning method. Classified category labels include pavement potholes, upheavals, subsidence, ruts and complex deformation. FIG. 4(a) is a grayscale diagram converted from three-dimensional pavement modeling depth data, and FIG. 4(b) is a pothole detection result.

Based on the embodiments mentioned above, the present embodiment further includes: calculating, based on the longitudinal section in the three-dimensional modeling data and a calculation formula of an international roughness index, a roughness of the pavement.

A roughness detection includes extracting a longitudinal contour for a roughness calculation based on three-dimensional pavement modeling data in combination with the longitudinal contour position required for the roughness calculation and then calculating the roughness index using the calculation formula of international roughness index (IRI).

A device for detecting pavement technical condition based on a three-dimensional contour according to the present application is described below. The device for detecting pavement technical condition based on a three-dimensional contour and the method for detecting pavement technical condition based on the three-dimensional contour described above can refer to each other.

The device includes a data acquisition platform, a power supply unit, a control unit, an index measurement unit, a data acquisition unit, a data processing unit and an abnormal warning unit.

The data acquisition unit is an advanced reduced instruction set computer (RISC) machine (ARM) module used for acquiring three-dimensional contour data and grayscale data of a pavement based on a line scanning three-dimensional measurement sensor.

The data processing unit is a field programmable gate array (FPGA) module used for preprocessing the three-dimensional contour data and the grayscale data, where the preprocessing the three-dimensional contour data and the grayscale data includes performing three-dimensional modeling on the three-dimensional contour data to acquire three-dimensional modeling data and correcting the grayscale data; and extracting a key contour of each cross section of the three-dimensional modeling data.

The data acquisition platform includes a vehicle and a line scanning three-dimensional measurement sensor, and the line scanning three-dimensional measurement sensor is mounted outside a vehicle body of the vehicle.

In an embodiment, small- and medium-sized passenger cars, small- and medium-sized trucks or sport utility vehicles (SUVs) are used as data acquisition platforms. The measurement sensors are mounted at different positions outside a vehicle body through structural components.

A photoelectric encoder is mounted on a wheel to provide running mileage information when a plurality of sets of measurement sensors are applied, and positioning data of a GNSS (Global Navigation Satellite System) are integrated with the running mileage information as an input of a synchronization controller to generate time and space reference, which provides data integration conditions for the measurement data of the plurality of sets of measurement sensors.

The index measurement unit is used for performing pavement technical condition index detection on the pavement based on the three-dimensional modeling data, the key contour and corrected grayscale data; where the pavement technical condition index detection includes a microscopic deformation distress target detection, a macroscopic deformation distress target detection, a texture index detection, a target detection based on integrated depth and grayscale information, and a roughness detection.

The index measurement unit is used for acquiring high-precision three-dimensional contour data of the pavement through line scanning three-dimensional measurement sensors. An attitude measurement sensor is used for acquiring a measurement attitude of the vehicle. The three-dimensional modeling of the pavement is performed based on the three-dimensional pavement contour data and measurement attitude. An integrated detection of the pavement technical condition index is performed based on the three-dimensional model of the pavement.

The power supply unit is used for suppling power for the line scanning three-dimensional measurement sensor and the index measurement unit.

The power supply unit is used for providing reliable and stable power for the entire detection device using an integrated power. The integrated power accepts one or more of the mains power supply, generator power supply and battery power supply. An output of the integrated power is divided into DC part and AC part, which are output to the relative distribution box to supply power to different equipment.

The integrated power is used for monitoring the operation of the entire power system, sending the relevant parameters to a controller, and cutting off the power supply line and alarming when the power supply unit is abnormal and completing the selection, transformation and distribution of electric energy.

The control unit is used for controlling the line scanning three-dimensional measurement sensor, the index measurement unit and the power supply unit.

The control unit mainly includes three parts: equipment control, power supply control and acquisition control. The equipment control and power supply control are hardware-level control, which are controlled by a synchronous controller. The acquisition control is a software control. All devices are in the acquisition state after the device is started, and only a control command is required to control whether the collected data is saved.

All control devices are mounted in a vehicle console. The hardware-level control is realized by buttons. The software-level control uses the main control software mounted by the computer to send and receive control instructions.

Finally, it should be noted that the above embodiments are only used to illustrate the solutions of the present application, rather than limiting the solutions. Although the present application is described in detail with reference to the above embodiments, those of ordinary skill in the art should understand that they can still modify the solutions recorded in the above embodiments, or make equivalent replacements to some of the features; these modifications or replacements do not make the essence of the corresponding solutions depart from the scope of the solutions of various embodiments of the present application.

What is claimed is:

1. A method for detecting pavement technical condition based on a three-dimensional contour, the method comprising:
acquiring three-dimensional contour data and grayscale data of a pavement based on a line scanning three-dimensional measurement sensor;
preprocessing the three-dimensional contour data and the grayscale data, wherein the preprocessing the three-dimensional contour data and the grayscale data comprises performing three-dimensional modeling on the three-dimensional contour data to acquire three-dimensional modeling data and correcting the grayscale data; and
extracting a key contour of each cross section of the three-dimensional modeling data, and performing pavement technical condition index detection on the pavement based on the three-dimensional modeling data, the key contour and corrected grayscale data to acquire a technical condition index of the pavement;
wherein the pavement technical condition index detection comprises a microscopic deformation distress target detection, a macroscopic deformation distress target detection, a texture index detection, a target detection based on integrated depth and grayscale information, and a roughness detection of the pavement.

2. The method of claim 1, wherein the key contour comprises a main contour and a standard contour; and
the extracting the key contour of each cross section of the three-dimensional modeling data comprises:
filtering elevation data of each cross section to acquire a reference cross-section contour of each cross section;
acquiring an abnormal point in each cross section based on an absolute distance between elevation data of each point on the cross section and elevation data of measurement point cross section on a reference section contour of each cross section;
replacing the elevation data of each abnormal point in each cross section with the elevation data of the measurement points in the reference section contour of each cross section, and filtering the replaced elevation data of each cross section to acquire the main contour of each cross section;
rarefying the elevation data of each cross section based on a principal component analysis (PCA) algorithm, and extracting a key point from rarefied each cross section based on a corner detection method;
dividing each cross section into a plurality of sub-segments based on the key point in each cross section, and calculating similarity of features between each sub-segment of each cross section and other sub-segments in each cross section; and
selecting the sub-segments with a similarity greater than a preset threshold value from the sub-segments of each cross section for fitting based on the similarity corresponding to each sub-segment of each cross section to acquire the standard contour of each cross section.

3. The method of claim 2, wherein the texture index detection comprises:
calculating difference values between the elevation data of measurement points on each cross section and the elevation data of measurement points on the main contour of each cross section to acquire deviation values of the measurement points on each cross section;
dividing the three-dimensional modeling data into a plurality of texture calculation units based on a preset length range along a driving direction of a vehicle where the line scanning three-dimensional measurement sensor is located;
dividing each texture calculation unit into longitudinal section sets corresponding to a left wheel track band, a right wheel track band and a midline position of a lane of the vehicle based on a preset width range;
calculating a mean of sensor measured texture depth (SMTD) values or a mean of mean profile depth (MPD) values of each longitudinal section set based on the SMTD values or the MPD values of each longitudinal section in each longitudinal section set; and
calculating a pavement wear rate of each longitudinal section set based on the mean of the SMTD values or the mean of the MPD values of each longitudinal section set.

4. The method of claim 3, wherein the calculating the pavement wear rate of each longitudinal section is set by the following formula based on the mean of the SMTD values or the mean of the MPD values of each longitudinal section set:

$$WR1 = 100 \times \frac{SMTD_C - \min\{SMTD_L, SMTD_R\}}{SMTD_C}; \text{ and}$$

$$WR2 = 100 \times \frac{MPD_C - \min\{MPD_L, MPD_R\}}{MPD_C};$$

wherein WR1 and WR2 are the pavement wear rate of each longitudinal section set, $SMTD_C$ is a mean of the SMTD values of the longitudinal section set corresponding to the midline position of the lane, $SMTD_L$ is a mean of the SMTD values of the longitudinal section set corresponding to a center position of the left wheel track band, $SMTD_R$ is a mean of the SMTD values of the longitudinal section set corresponding to the center position of the right wheel track band, $MPD_C$ is a mean of the MPD values of the longitudinal section set corresponding to the midline position of the lane, $MPD_L$ is a mean of the MPD values of the longitudinal section set corresponding to the midline position of the left wheel track band, and $MPD_R$ is a mean of the MPD values of the longitudinal section set corresponding to the midline position of the right wheel track band.

5. The method of claim 2, wherein the microscopic deformation distress target detection comprises:
taking difference values between elevation data of the measurement points on each cross section and elevation data of the measurement points on the main contour of each cross section as local difference values;
calculating a mean local difference value in a preset range centered on each point in each cross section, and acquiring a threshold value corresponding to each point from the mean local difference value corresponding to each point;
in case that the local difference value corresponding to each point is greater than a threshold value corresponding to each point, regarding each point as a suspected target point;
constructing a suspected target binary image based on the suspected target point in all cross section of the line scanning three-dimensional data, and dividing the suspected target binary image into blocks to acquire a plurality of suspected target sub-blocks;
classifying each suspected target sub-block based on a deep learning model, acquiring the suspected target sub-blocks containing a target, and growing each suspected target sub-block containing the target to acquire a cracking morphological sub-block; and based on all cracking morphology sub-blocks, acquiring a microscopic deformation distress target in the pavement.

6. The method of claim 5, wherein the macroscopic deformation distress target detection comprises:

calculating the difference value between the elevation data of the measurement point corresponding to the standard contour and the main contour of each cross section; and in case that an absolute value of the difference value between the elevation data corresponding to each point is greater than the threshold corresponding to each point, taking each point as a deformation feature point;

performing growing and denoising by taking deformation feature points constituted a connected region as basic units on a deformation feature image constituted by the deformation feature points in all the cross sections of the three-dimensional modeling data, and then acquiring a deformation region in the deformation feature image; and determining an edge of the deformation based on the difference values of the elevation data corresponding to each point in the deformation region or edge features of the difference values of the elevation data, and determining the deformation region having the determined edge as a macroscopic deformation distress target of the pavement.

7. The method of claim 1, wherein the target detection based on the integrated depth and grayscale information comprises:

determining a target initial positioning region in the pavement based on the corrected grayscale data; wherein the target initial positioning region comprises the initial positioning region of a pavement marking, a pavement speed hump, a pavement expansion joint and a pavement repair;

determining a target region in the target initial positioning region based on a texture distribution and an edge feature of the elevation data of all points in the target initial positioning region;

processing the target region based on morphology to acquire a geometric size of the processed target region;

acquiring a type of the target region by classifying the target region based on the grayscale data of the target region, the texture distribution and geometric size of the processed target region; and calculating a wear degree of the target region based on the elevation data of the target region and a calculation model corresponding to the type of the target region.

8. The method of claim 1, wherein the performing the three-dimensional modeling on the three-dimensional contour data to acquire the three-dimensional modeling data comprises:

converting the three-dimensional contour data from image-side elevation data to object-side elevation data;

performing measurement attitude correction on the object-side elevation data;

processing an abnormal measurement point in the object-side elevation data on which the measurement attitude correction is performed; and splicing the cross-section data of the object-side elevation data in which the abnormal measurement point is processed along the driving direction of the vehicle at which the line scanning three-dimensional measurement sensor is located to acquire the three-dimensional modeling data.

9. The method of claim 1, further comprising:

calculating a roughness of the pavement based on the longitudinal section in the three-dimensional modeling data and a calculation formula of an international roughness index.

10. A device for detecting pavement technical condition based on a three-dimensional contour, comprising a data acquisition platform, a power supply unit, a control unit, an index measurement unit, a data acquisition unit, a data processing unit and an abnormal warning unit;

wherein the data acquisition unit is an advanced reduced instruction set computer (RISC) machine (ARM) module, used for acquiring three-dimensional contour data and grayscale data of a pavement based on a line scanning three-dimensional measurement sensor;

the data processing unit is a field programmable gate array (FPGA) module, used for preprocessing the three-dimensional contour data and the grayscale data, wherein the preprocessing the three-dimensional contour data and the grayscale data comprises performing a three-dimensional modeling on the three-dimensional contour data to acquire three-dimensional modeling data and correcting the grayscale data; and extracting a key contour of each cross section of the three-dimensional modeling data;

the data acquisition platform comprises a vehicle and a line scanning three-dimensional measurement sensor, and the line scanning three-dimensional measurement sensor is mounted outside a vehicle body of the vehicle;

the index measurement unit is used for performing technical condition index detection on the pavement based on the three-dimensional modeling data, the key contour and corrected grayscale data to acquire a technical condition index of the pavement; wherein the pavement technical condition index detection comprises a microscopic deformation distress target detection, a macroscopic deformation distress target detection, a texture index detection, a target detection based on integrated depth and grayscale information, and a roughness of detection of the pavement;

the power supply unit is used for suppling power for the line scanning three-dimensional measurement sensor and the index measurement unit; and the control unit is used for controlling the line scanning three-dimensional measurement sensor, the index measurement unit and the power supply unit.

* * * * *